Dec. 4, 1951  S. HACKNEY  2,577,462
PRESSURE OPERATED MECHANISM
Filed Dec. 21, 1948  5 Sheets-Sheet 3
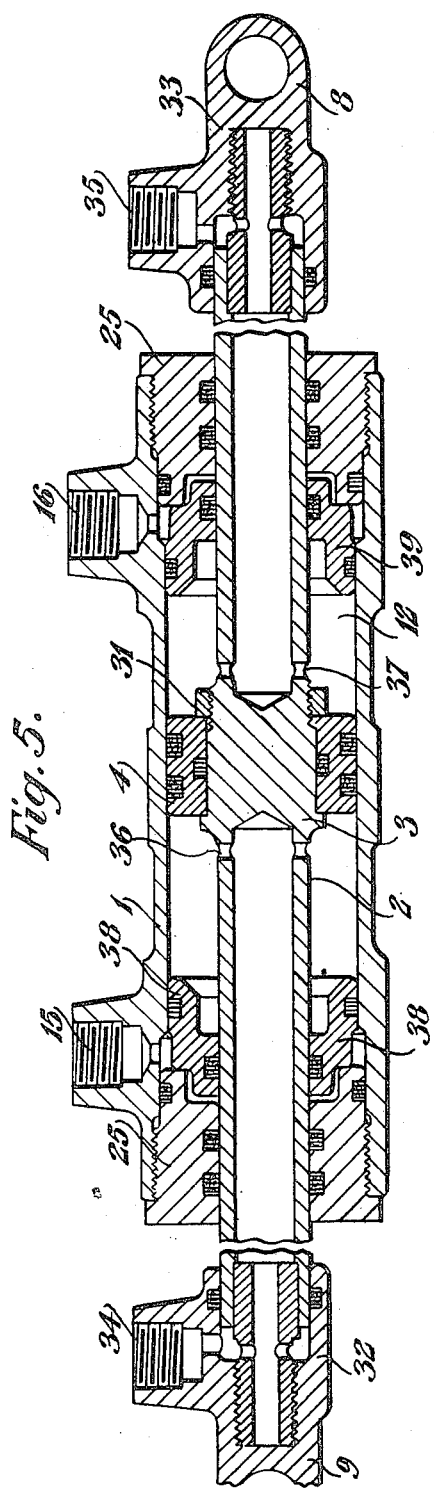
Inventor:
Stanley Hackney; by his attorneys,
Baldwin, Wight, & Brevost

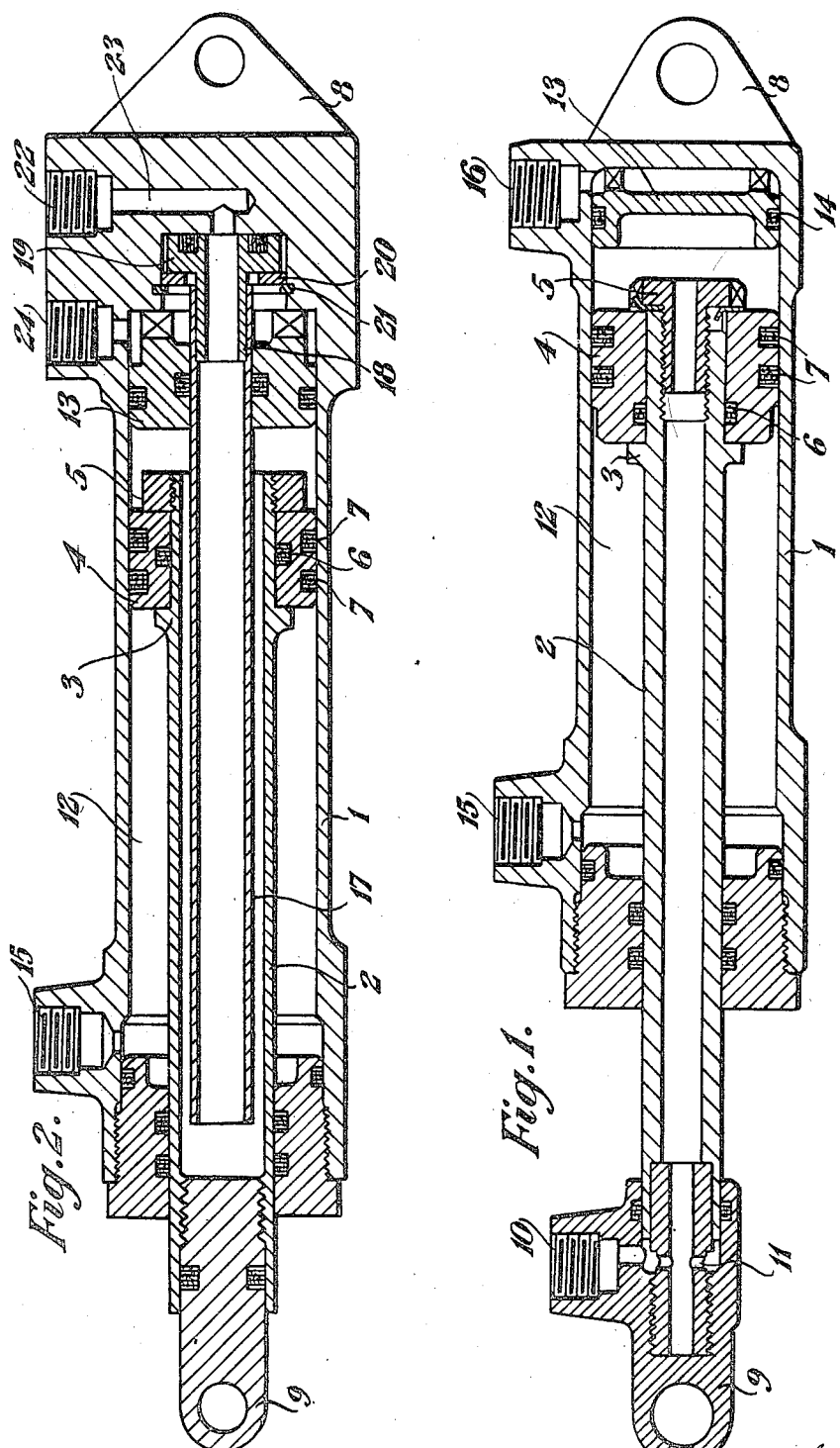

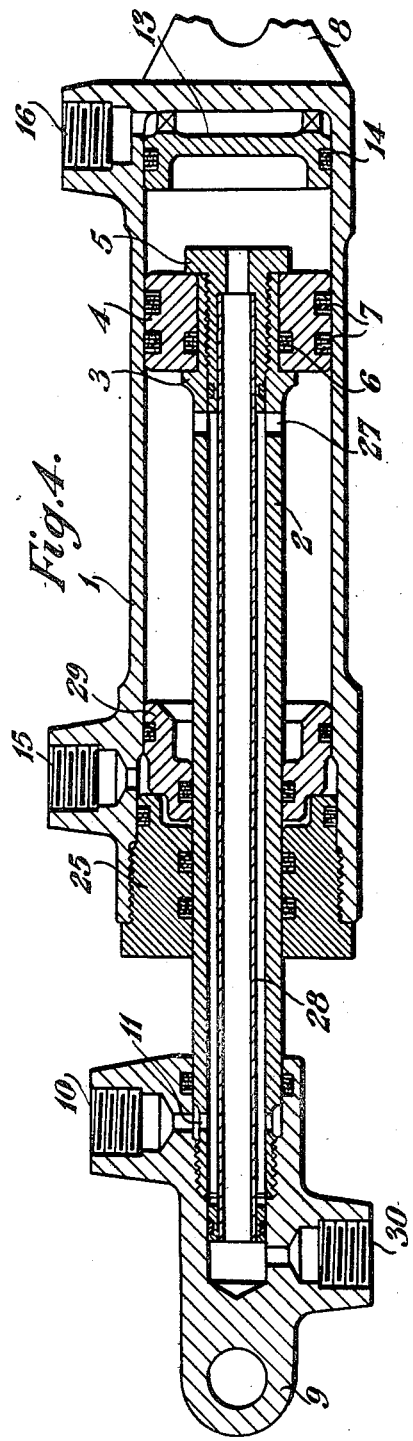

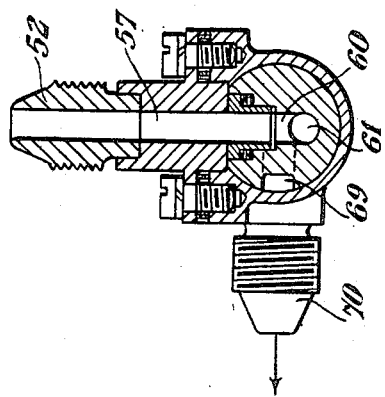
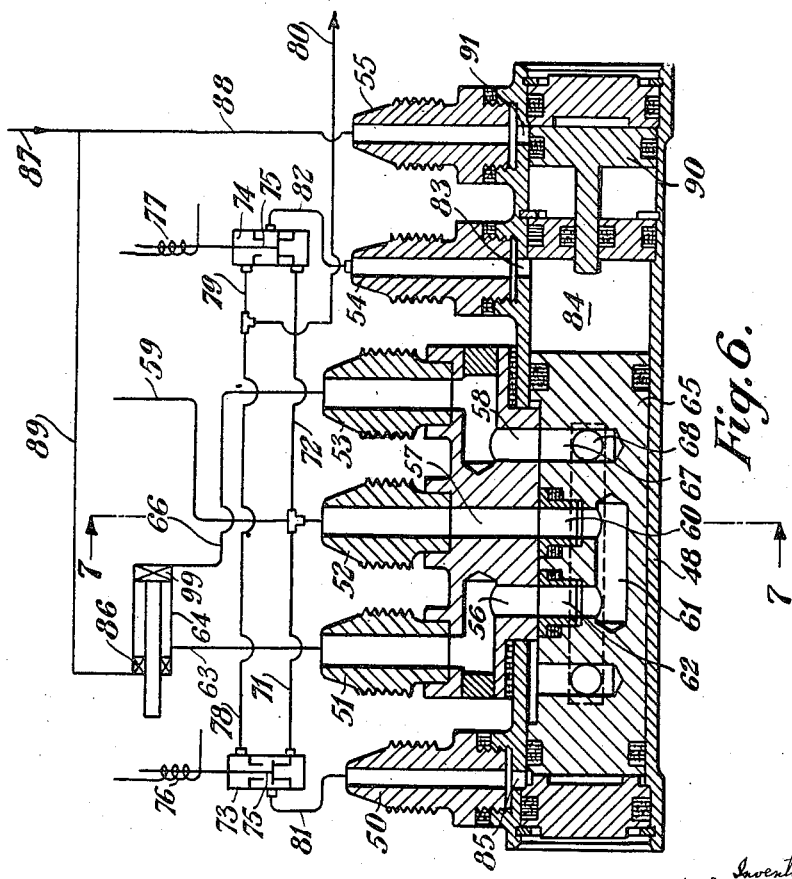

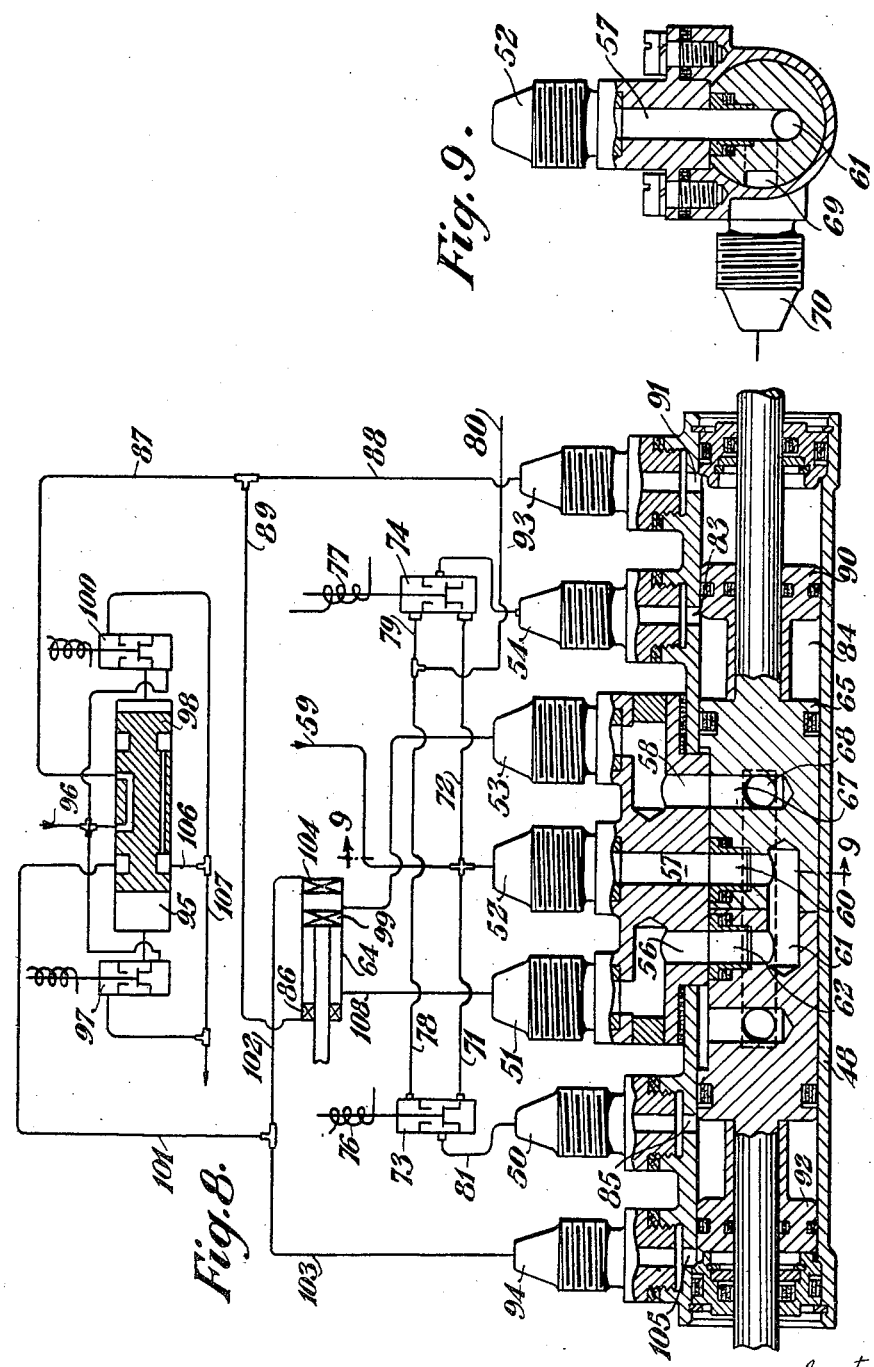

Patented Dec. 4, 1951

2,577,462

UNITED STATES PATENT OFFICE 2,577,462

PRESSURE OPERATED MECHANISM

Stanley Hackney, Warrington, England, assignor to Electro-Hydraulics Limited, Warrington, England, a company of Great Britain Application December 21, 1948, Serial No. 66,484
In Great Britain December 22, 1947

12 Claims. (Cl. 121—38)

This invention relates to fluid pressure operated mechanism, e. g., pressure operated systems, which may include either a motor system or a selector valve system or both, and is concerned with the provision of means which will operate the system on selection of one of at least two pressure supplies.

The invention is particularly useful for use with aircraft, for example for working the flying controls, undercarriages, locks and bomb doors by jacks, in which case the invention concerns means for operating the motor in cases of emergency, that is to say, cases in which the normal supply of pressure fails.

As aircraft become larger and heavier, a state of affairs is approached where the force required to operate the flying controls is so great that in some cases the pilot may not have sufficient physical strength to move the flying control lever. For this and other reasons it becomes necessary in power assisted flying controls, that is flying controls operated by means of jacks or other motors, to incorporate a complete emergency system, and, in cases where motors are employed, to provide for emergency operation in either one or both directions. The invention is applicable to single or double acting systems.

According to the present invention a pressure operated system comprises a sliding piston assembly operated by one supply source, and a floating piston operated by another supply source, both the sliding piston assembly and the floating piston as selected controlling in one or other or both directions the member to be operated.

When the invention concerns a pressure-operated motor system it is preferable to employ a double-acting motor in which case the system may comprise a sliding piston assembly for normal extension and retraction of motor and a floating piston working in the bore of the motor cylinder which also serves for normal operation of the motor, the floating piston being operable by the alternative source of supply to operate the motor in one or other or both directions. When it is desired that the floating piston shall operate to extend the motor, the sliding piston assembly preferably comprises a double-acting piston of any known design and a hollow piston rod, the floating piston being placed between the annular area of the main piston and the motor cylinder end wall; when, however, the floating piston is arranged to operate so as to retract the motor the floating piston is of the annular type and arranged to slide on the main piston rod which is preferably hollow and provided with an abutment against which the main piston is retained by an adjustable stop.

Various forms of the invention are illustrated in the accompanying drawings in which Figure 1 shows an arrangement in which an alternative supply is capable of extending the motor; Figure 2 is a modified form of Figure 1 whilst Figure 3 shows the alternative circuit for operating retraction of the motor. Figures 4 and 5 show a system in which two different circuits can extend or retract the motor, the difference between the systems residing only in the construction of motor. Figure 6 shows the invention as applied to a selector valve mechanism, Figure 7 being a section on the line 7—7, Figure 6, and Figure 8 shows a similar arrangement, Figure 9 being a section on the line 9—9, Figure 8.

Referring to the arrangement shown in Figure 1 there is provided a motor of the two-volume type in the cylinder 1 of which is arranged a hollow piston rod 2 provided with an annular flange 3 acting as a seating for the main piston 4, which is retained thereagainst by a bored securing nut 5, suitable packings 6, 7 being provided to seal the main piston against the piston rod and the bore of the cylinder.

One end of the cylinder is provided with a suitable attachment means such as an eye bolt lug 8, whilst the piston rod 2 at its free end is also provided with a similar attachment means 9, in which is provided a suitable inlet 10 through which liquid pressure can pass through a groove 11 into the hollow piston rod, to pass therethrough via the bored securing nut into the cylinder bore 12. When pressure is so admitted it acts on the main piston to move it to one end of the cylinder so that the motor is extended, i. e., to the left (Figure 1). There is also provided within a cylinder a floating piston 13 which is rendered pressure-tight against the cylinder by suitable packings 14. The cylinder is also provided with two liquid pressure inlets 16, 16, and on admission of liquid pressure through the inlet 16, the pressure acts upon the floating piston 13 tending to force it outwardly in the cylinder, the said floating piston during such movement carrying with it the main piston 4 and piston rod 2, constituting the sliding piston assembly. It will thus be appreciated that the motor can be extended by admitting liquid pressure to the cylinder bore 12, either through the hollow piston rod 2 or through the inlet connection 16, and either of the connections 10, 16 can be employed as normal or alternative operation inlets. To retract the motor, liquid pressure is admitted to the bore 12 of the cylinder through the connection 15 to the undersurface of the main piston 4 to act on its annular area, thus causing movement of the sliding piston assembly into the motor, carrying with it the floating piston 13.

In the alternative form shown in Figure 2 the floating piston 13 is slidably mounted on a hollow tubular member 17 and which extends within the hollow piston rod 2, but is of such dimensions as to provide free passage for the flow of liquid pressure through the hollow piston rid into the cylinder bore 12. In this arrangement the connections for the supply of fluid pressure are all provided on the cylinder, the hollow piston rod for this purpose being plugged at its outer end in a known manner. The hollow tubular member is formed with a bored plug 18 having a flange 19 to provide a fluid-tight seal and is in fixed connection with the cylinder 1 through, for example, a washer 20 and circlip 21. To extend the motor, liquid pressure is supplied to a connection 22 at one end of the cylinder, which liquid pressure passes through suitable communication passages 23 into the hollow tubular member 17, thence into the hollow piston rod 2 and into the cylinder bore 12 to act on the sliding piston assembly, and cause extension of the motor. Again the motor can be extended only by the supply of fluid pressure through an alternative connection 24, to act on the floating piston 13 to move it into the cylinder, carrying with it the sliding piston assembly. To retract the motor, liquid pressure is applied at the other end of the cylinder, through connection 15, to act on the annular area of the main piston, thereby obtaining retraction.

In the arrangement shown in Figure 3 in which the alternative circuit operates to cause retraction of the motor, the floating piston 13 is interposed between the main piston 4 and the packing glands 25 at the outer end of the cylinder, the floating piston being of an annular type arranged to slide on the piston rod 2. In this arrangement the piston rod 2 is again provided with an annular flange 3 acting as a seating for the main piston 4 which is retained against the flange and on the piston rod by a screwing nut 26 entering the hollow piston rod. Extension of the motor may be obtained by liquid pressure supplied through connection 16 acting on the full area of the main piston 4 whilst retraction is arranged by applying pressure through connection 10, the hollow piston rod 2 and through ports 27 therein adjacent the annular flange 3 so as to allow liquid pressure to enter the cylinder bore 12 from the hollow piston rod.

The other inlet 15 to the cylinder allows fluid pressure to act on the floating piston 13 to move it to contact the opposite surface of the annular flange 3 on the piston rod 2 thereby forcing the piston rod and main piston to the retracted position.

Referring now to the arrangement shown in Figure 4 this allows extension or retraction of the motor by two different circuits so that the arrangement can be utilised to obtain emergency extension and retraction of the motor, as well as normal operation thereof. In this arrangement there is provided a sliding piston assembly including a main piston 4 and hollow piston rod 2, the piston being secured against the flange 3 thereon by a bored securing nut 5, the hollow piston rod having ports 27 as in the arrangement shown in Figure 3. Within the hollow piston rod is a hollow tubular member 28 which communicates with the bored securing nut 5 at one end. Between the normal gland 25 closing the open end of the cylinder bore 12 and the main piston 4 is a floating piston 29 which slides on the hollow piston rod 2, whilst between the main piston 4 and the other end of the cylinder is a further floating piston 13, the cylinder, as previously, being provided with pressure supply inlets 15, 16. The hollow piston rod 2 carries the eye bolt attachment means 9 in which is provided an inlet 10 for supplying liquid pressure through the groove 11 to the hollow piston rod and a second inlet 30 for supplying liquid pressure directly to the hollow tubular member 28 within the hollow piston rod 2.

Extension of the motor can be obtained in either of two ways, for example by admitting liquid pressure through the connection 16 to operate on the floating piston 13 which on movement contacts the sliding piston assembly to move it into the cylinder thereby causing extension of the motor. Extension of the motor can also be obtained by supplying liquid pressure through the connection 30 to the hollow tubular member 28 so that the liquid pressure passes through said member 28, through the bored securing nut 5 to act on the full area of the main piston.

One way in which retraction of the motor can be obtained is by allowing liquid pressure to pass through the connection 15 to the cylinder bore 12 and thus to act on the floating piston 29 which slides on the rod 2 until it contacts the main piston and then causes the sliding piston assembly to move into the motor. An alternative means of retraction can be obtained by allowing fluid pressure to pass through the connection 10 and groove 11 into the hollow piston 2 to pass out through the ports 27 and thus act on the annular area of the main piston 4 thereby causing retraction.

Referring now to Figure 5 the motor illustrated therein is capable of being operated in both directions by two alternative sources of pressure supply of the so-called balanced type, that is wherein the area of the pressure is equal on both sides of the piston or pistons. In this arrangement the hollow piston rod 2 passes through glands 25 at each end of the cylinder 1 and the main piston 4 is secured on the hollow piston rod by the flange 3 and a lock nut 31. Carried at one end of the piston rod 2 for example by being brazed thereto is a plug 32 onto which is screwed the eye bolt 9 for attachment of members to be moved by the motor. At the other end the piston rod carries a similar plug 33 and attachment member 8. The member 9 is provided with a fluid pressure inlet 34 whilst the member 8 has a similar inlet 35 so that fluid pressure can pass through either of these connections into the hollow piston rod 2 on either side of the main piston 4; ports 36, 37 are provided to allow communication between the two parts of the hollow piston rod and the cylinder bore 12. In the said bore 12 slide two floating pistons 38, 39 which slide on the hollow piston rod. The motor is held in fixed position by any suitable means, for example trunnions carried by or integral with the cylinder. The system works as follows:

When fluid pressure is admitted through the connection 35 it will pass into the right-hand part of the hollow piston rod through the ports 37 to act on the right-hand side of the piston 4 and move it towards the left, carrying the piston rod with it. In order to move the piston and the piston rod to the left, fluid pressure is admitted through the connection 34 which passes through the hollow piston rod and the ports 36. The motor may also be operated and this may preferably be done by another source of fluid pressure supply, by admitting fluid pressure at either of the connections 15 or 16. When fluid pressure is admitted through the connection 16 it passes into the bore 12 of the cylinder to act on the floating piston 39 and move it towards the left so that it eventually carries with it piston 4 and the piston rod. When fluid pressure is admitted through the connection 15 it similarly passes into the cylinder bore, similarly acts on the floating piston 38 and moves the main piston 4 to the right. It will thus be appreciated that the motor can be operated in both directions by alternative sources of pressure supply.

In all cases in which a double-acting motor has been described it will of course be clear that in place of a double-acting motor a single-acting motor could be provided which could be biassed into one position by a spring or by the weight of the part to be moved.

It will, of course, be appreciated that in all the constructions referred to above where two connections are provided to obtain either extension or retraction, either of these two connections can be employed as the normal method of extension or retraction, and the other as the emergency connection.

If the undercarriage of an aircraft is operated by a motor, the arrangement may be such that very little force is needed to lower it and Figure 6 illustrates an arrangement of the motor adapted for this purpose.

With arrangements described above the motor may have incorporated therein a mechanical lock, for example of the type described in the British patent specification 527,225, or a load limiting device of the type described in the specification of British Patent 652,094.

The invention may be applied to a selector valve mechanism adapted to operate a motor for lowering the undercarriage in cases of emergency. In this case the selector valve mechanism is operated by one or other of the two alternative pressure supplies, and in one case the supply enters the selector valve body and moves the valve so that pressure can be admitted to the motor to retract the motor. The alternative pressure supply, however, enters the selector valve body and operates a floating piston which in turn ensures that the valve is so positioned in the selector body that exhaust from the motor cylinder can pass to atmosphere or tank. Figures 6 to 9 illustrate two arrangements in which the invention is applied to a selector valve mechanism.

Referring to Figures 6 and 7 the selector valve indicated generally at 48 is adapted to be operated both manually and electrically and for the clearer understanding of the invention a brief description of its construction and normal operation will now be given.

The selector 48 is provided with a valve in the form of a piston 65 and fluid connections 50, 51, 52, 53, 54, 55, connections 51, 52 and 53 each being provided with a port, namely 56, 57 and 58. If the selector is manually operated then fluid pressure enters connection 52 from line 59, passes through ports 57 and 60, passage 61 into ports 62 and 56, thence through connection 51 and line 63, where it retracts the motor 64. The fluid pressure from the other side of the piston of motor 64 returns through line 66, connection 53 into ports 58, 67, 68 and 69, and passes through connection 70 to exhaust.

The fluid pressure line 59 is provided with two branch lines 71, 72 for use when the selector is operated electrically which lead into the underside of shuttle valves 73 and 74. The shuttle valves are of identical construction and each contain a valve and valve spindle 75 which carries or has formed integrally therewith the armature of each of a pair of solenoids 76, 77, said shuttle valves 73, 74 being provided with pipe lines 78, 79 which lead into an exhaust line 80. Shuttle valve 73 is connected by line 81 to one side of the selector piston 65 and shuttle valve 74 is connected by a line 82 to the other side of said piston.

It will be appreciated that the normal operation of the system is as follows: to retract the motor 64 the solenoid 77 is actuated and its armature will carry the associated spindle 75 upwardly, thus opening the shuttle valve 74, this action allowing fluid pressure supply coming from lines 59 and 72 to pass through into line 82, thence through connection 54 and port 83 into the bore 84 of the selector, thereby moving the piston 65 to the left, the fluid on the other side of said piston 65 passing through port 85, connection 50, line 81, through lines 78 and 80 to exhaust. To extend the motor 64, solenoid 76 is actuated in a like manner and the reverse procedure effected.

If in the case of emergency it is desired to retract the motor 64 containing an emergency piston 86, fluid pressure is supplied through the emergency line 87, this line branching out into lines 88 and 89, so that pressure will act substantially simultaneously on the emergency piston 86 and the floating piston 90 of the selector valve 48. When in the case of emergency fluid pressure is admitted by any suitable means into the line 87 and thence to line 88, it will pass through the connection 55 and port 91 into the bore to the right of the floating piston 90 of the selector valve 48 where it will act upon the floating piston 90, said piston 90 being moved in the bore of the selector 48, together with the piston 65 if the latter is not in the left hand position already. Substantially simultaneously fluid pressure will act on the emergency piston 86 of the motor 64 thus closing said motor and lowering the undercarriage.

Figures 8 and 9 show a selector valve embodying the invention, capable of operating a motor with alternative fluid pressure in both directions. Housed within the bore 84 of the selector valve are the floating pistons 90 and 92, the selector valve being provided with two additional fluid connections 93, 94, the alternative source of fluid supply being preferably, but not necessarily, operated by a selector 95 of the type described in connection with Figures 6 and 7.

The operation of the system is such that if the motor 64 is to be operated by fluid pressure from line 59 the selector 48 acts as that shown in Figures 6 and 7, and when the alternative source of fluid pressure supply from line 96 is employed pressure is admitted into the line 96 by any suitable means, e. g. a cock.

To retract the motor 64 shuttle valve 97 is operated to move the piston 98 to the right, fluid then passing through the selector 95, thence into branch lines 87, 88, 89. The pressure will pass from line 89 into the motor 64, act on the piston 86 carrying the piston 99 with it, and retract said motor 64. At the same time, fluid pressure will enter the selector valve 48 from line 88 through connections 93 and 91, and act on the floating piston 90 moving it to the left together with the piston 65 of said selector 48, thus enabling the fluid from the right-hand side of the piston 99 of the motor 64 to pass to exhaust.

When it is desired to extend the motor, fluid pressure is admitted through the valve 100 thus moving the piston 98 to the left, such movement allowing fluid from line 96 to pass through the selector 95 into line 101 and its branch lines 102, 103. The fluid from line 102 will enter motor 64 where it will act on the piston 104 to move it to the left, together with the piston 99, thus extending the motor.

At the same time pressure will pass from line 103 through connection 94, port 105 into the bore 84 of the selector 48, where it will act on the floating piston 92 and move it to the right carrying the piston 65 of the selector 48 with it. When this occurs fluid from the right hand side of the floating piston 90 will pass through lines 88 and 87, as well as the selector 95 into line 106, and return by line 107 to exhaust. Fluid from the left-hand side of piston 99 of the motor 64 will thus be allowed to pass to exhaust by means of line 108 via the selector 48 and line 80.

What I claim is:

1. In a fluid pressure system for moving a member, a motor comprising cylinder means, a piston assembly element including a main piston and piston rod slidable in said cylinder means, and a floating piston element slidable within said cylinder means, said floating piston element sealing one portion of said cylinder means against communication with and thereby isolating it from other portions thereof; means connecting said motor to said member; two independent fluid pressure supply sources; and flow-control means including change-over selector mechanism for directing fluid to flow from a selected one of said sources into said cylinder means to act on a selected one of said elements for effecting a full stroke of said motor in either selected direction; the sealing of said isolated cylinder portion from the other of said cylinder portions causing flow of pressure fluid to said isolated cylinder portion to operate said floating piston to thereby effect such a stroke without such flow being communicated to said other portions of said cylinder means, whereby if said other portions of said cylinder means are in communication with a leak the pressure of fluid introduced into said isolated cylinder portion will not be diminished and said motor will be operated a full stroke by said floating piston irrespective of the leak.

2. Fluid pressure system apparatus as set forth in claim 1 in which the main piston is a double acting piston, the selector mechanism being operable for directing fluid under pressure from one supply source into portions of said cylinder on opposite sides of said main piston selectively, and being operable for directing fluid under pressure from the other of said supply sources into the said isolated cylinder portion.

3. Fluid pressure system apparatus as set forth in claim 2 in which the piston rod of the piston assembly element is hollow to provide for flow of pressure fluid from said one of said sources into a portion of said cylinder on one side of said main piston other than said isolated cylinder portion.

4. Fluid pressure system apparatus as set forth in claim 3, in which the connection of the piston rod to the main piston provides an annular area on one side of said piston effective for the application of pressure for moving said piston assembly element, the floating piston being positioned between the opposite side of said piston and the adjacent end of the cylinder.

5. Fluid pressure system apparatus as set forth in claim 3, in which the connection of the piston rod to the main piston provides an annular area on one side of said piston effective for the application of pressure for moving said piston assembly element, the floating piston being positioned between the side of said piston having said annular area and the adjacent end of said cylinder.

6. Fluid pressure system apparatus as set forth in claim 5 in which the floating piston is annular and slidable on said piston rod which extends through said floating piston, the periphery of said floating piston having sealed sliding engagement with the walls of said cylinder.

7. Fluid pressure system apparatus as set forth in claim 3 in which said cylinder has two pressure supply inlets independent of the hollow piston rod, one of said inlets being located to introduce fluid into said isolated cylinder portion, and the other of said inlets being located to introduce fluid into said cylinder on the side of said main piston opposite the side thereof at which fluid may be introduced through said piston rod.

8. Fluid pressure system apparatus as set forth in claim 3 including a hollow tubular member mounted in said cylinder at one end thereof and projecting into said hollow piston rod, all the connections from said flow-control means and said motor leading through walls of said cylinder and including a connection leading through a cylinder wall into said hollow tubular member, a connection leading through a cylinder wall into said isolated cylinder portion, and a connection leading through a cylinder wall into the portion of said cylinder through which said piston rod extends.

9. Pressure supply system apparatus as set forth in claim 3 in which said hollow piston rod is formed with ports providing communication between the interior of said piston rod and the portion of said cylinder through which said piston rod extends.

10. Pressure supply system apparatus as set forth in claim 3 in which said hollow piston rod is open at the end thereof at which it is connected to said main piston to provide communication between the interior of said hollow piston rod and the portion of said cylinder opposite the portion thereof through which said piston rod extends.

11. Pressure supply system apparatus as set forth in claim 3 including two floating pistons respectively sealing off two isolated cylinder portions, said hollow piston rod having ports therein adjacent to one side of said main piston, a hollow tubular member fixed to said main piston and communicating with said cylinder on the side of said main piston opposite said ports, and projecting through said hollow piston rod in spaced relation thereto, and pressure supply connections communicating respectively with said isolated cylinder spaces individually, with said tubular member, and with the space between said tubular member and said hollow piston rod.

12. Pressure supply system apparatus as set forth in claim 3 in which the hollow piston rod projects through each end of the cylinder, the projecting end portions of said rod having respective means for attachment to members to be operated, and ports in said cylinder rod on each side of said main piston, there being a floating piston in said cylinder on each side of said main piston.

STANLEY HACKNEY.

REFERENCES CITED

The following references are of record in the file of this patent:

UNITED STATES PATENTS

| Number | Name | Date |
| --- | --- | --- |
| 2,005,387 | Pelton | June 18, 1935 |
| 2,396,984 | Broadston et al. | Mar. 19, 1946 |
| 2,397,106 | Haller | Mar. 26, 1946 |

FOREIGN PATENTS

| Number | Country | Date |
| --- | --- | --- |
| 73,412 | Switzerland | Oct. 2, 1916 |
| 84,804 | Switzerland | Apr. 16, 1920 |